(12) United States Patent
Tanaka et al.

(10) Patent No.: US 8,873,172 B2
(45) Date of Patent: Oct. 28, 2014

(54) LINEAR MOTOR AND LENS UNIT

(75) Inventors: Toshihisa Tanaka, Yokohama (JP); Eiji Matsukawa, Yotsukaido (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/331,413

(22) Filed: Dec. 20, 2011

(65) Prior Publication Data
US 2012/0087022 A1 Apr. 12, 2012

Related U.S. Application Data

(63) Continuation of application No. PCT/JP2010/005544, filed on Sep. 10, 2010.

(30) Foreign Application Priority Data

Sep. 10, 2009 (JP) .................... 2009-209736

(51) Int. Cl.
G02B 7/02 (2006.01)
G03B 19/12 (2006.01)
G02B 7/08 (2006.01)
G03B 3/10 (2006.01)
H02K 41/03 (2006.01)
G03B 17/14 (2006.01)
H02K 11/00 (2006.01)

(52) U.S. Cl.
CPC G02B 7/08 (2013.01); G03B 19/12 (2013.01); G03B 3/10 (2013.01); H02K 41/03 (2013.01); H02K 11/0015 (2013.01); G03B 17/14 (2013.01)
USPC .......................................... 359/824; 359/823

(58) Field of Classification Search
USPC .................................. 359/694–706, 822–830
See application file for complete search history.

(56) References Cited

U.S. PATENT DOCUMENTS

| | | | |
|---|---|---|---|
| 5,541,777 A | 7/1996 | Sakamoto et al. | |
| 5,939,804 A | 8/1999 | Nakao et al. | |
| 6,008,552 A | 12/1999 | Yagoto et al. | |

(Continued)

FOREIGN PATENT DOCUMENTS

| | | | |
|---|---|---|---|
| CN | 1190746 A | 8/1998 | |
| CN | 1959453 A | 5/2007 | |

(Continued)

OTHER PUBLICATIONS

International Preliminary Report on Patentability issued in International Patent Application No. PCT/JP2010/005544 dated Apr. 11, 2012.

(Continued)

Primary Examiner — Mahidere Sahle
(74) Attorney, Agent, or Firm — Oliff PLC

(57) ABSTRACT

Provided is a linear motor comprising a magnet including a first region polarized to have a magnetic pattern for driving and a second region polarized to have a magnetic pattern for position detection, the first and second regions being arranged linearly in a direction of the driving; a drive coil that is provided opposite the first region and generates a drive force exerted on the magnet in the direction of the driving; a magnetic sensor arranged opposite the second region; and a base member that supports the magnet, the drive coil, and the magnetic sensor such that the magnet can be moved relative to the drive coil and the magnetic sensor in the driving direction.

16 Claims, 6 Drawing Sheets

(56) References Cited

U.S. PATENT DOCUMENTS

| | | | |
|---|---|---|---|
| 6,329,728 | B1 | 12/2001 | Kitazawa et al. |
| 2007/0097531 | A1 | 5/2007 | Kuo et al. |
| 2007/0253075 | A1 | 11/2007 | Yasuda |
| 2009/0195087 | A1 | 8/2009 | Kurosawa |
| 2011/0007408 | A1* | 1/2011 | Kurosawa et al. ............ 359/824 |

FOREIGN PATENT DOCUMENTS

| | | |
|---|---|---|
| JP | A-09-222318 | 8/1997 |
| JP | A-10-201216 | 7/1998 |
| JP | A-2000-262034 | 9/2000 |
| JP | A-2009-189091 | 8/2009 |

OTHER PUBLICATIONS

Oct. 1, 2013 Office Action issued in Japanese Application No. 2009-209736 (w/ English Translation).

Dec. 10, 2013 Office Action issued in Chinese Application No. 201080040114.9 (with English translation).

* cited by examiner

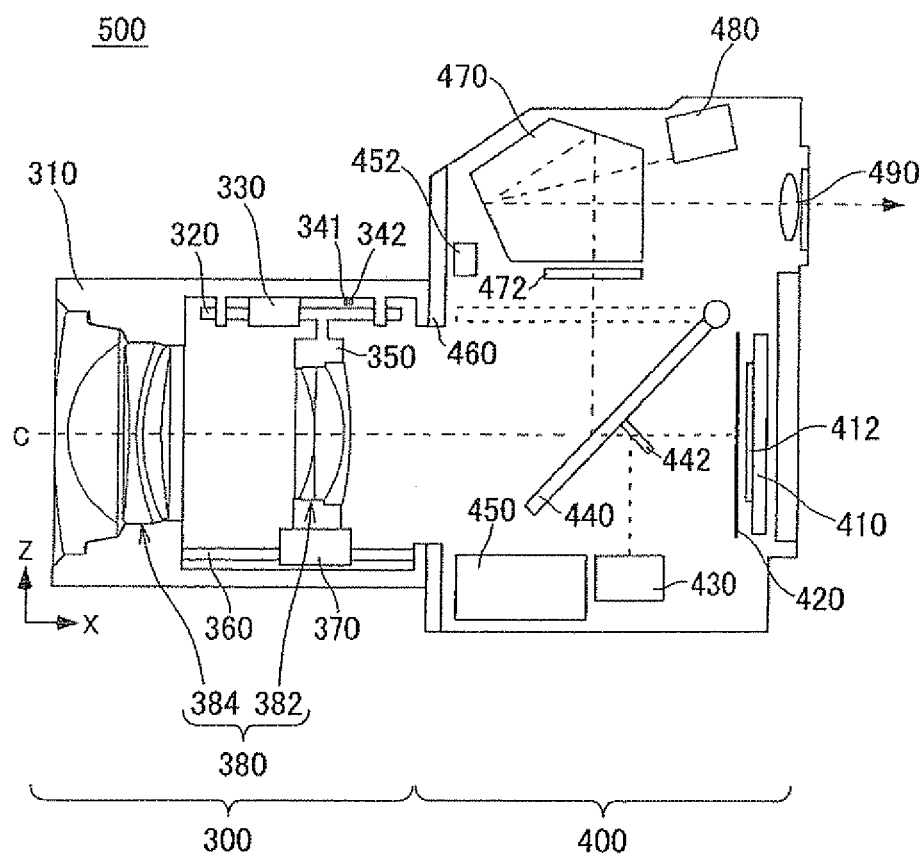
F I G . 5

LINEAR MOTOR AND LENS UNIT

The contents of the following Japanese patent application are incorporated herein by reference: No. 2009-209736 filed on Sep. 10, 2009.

The contents of the following International patent application are incorporated herein by reference: No. PCT/JP2010/005544 filed on Sep. 10, 2010.

BACKGROUND

1. Technical Field

The present invention relates to a linear motor and a lens unit.

2. Related Art

A configuration using a wire and a rotary encoder is conventionally used as a position detecting mechanism for moving bodies in a linear motor. This mechanism detects position by using the rotary encoder to detect the amount of relative change with respect to a wire pulled between a scanning table, which is a moving component, and a fixed point on a rail, as shown in Patent Document 1, for example.

Patent Document 1: Japanese Patent Application Publication No. H09-222318

With this mechanism, however, a wire coiling mechanism is used in addition to the rotary encoder to apply a prescribed tensile force to the wire. Therefore, the size of the apparatus is increased.

SUMMARY

To solve the above problem, according to a first aspect related to the innovations herein, provided is a linear motor comprising a magnet including a first region polarized to have a magnetic pattern for driving and a second region polarized to have a magnetic pattern for position detection, the first and second regions being arranged linearly in a direction of the driving; a drive coil that is provided opposite the first region and generates a drive force exerted on the magnet in the direction of the driving; a magnetic sensor arranged opposite the second region; and a base member that supports the magnet, the drive coil, and the magnetic sensor such that the magnet can be moved relative to the drive coil and the magnetic sensor in the driving direction.

According to a second aspect related to the innovations herein, the linear motor is provided in a lens unit.

The summary clause does not necessarily describe all necessary features of the embodiments of the present invention. The present invention may also be a sub-combination of the features described above.

BRIEF DESCRIPTION OF THE DRAWINGS

FIG. 5 is a schematic cross-sectional view of an overall configuration of an image capturing apparatus.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
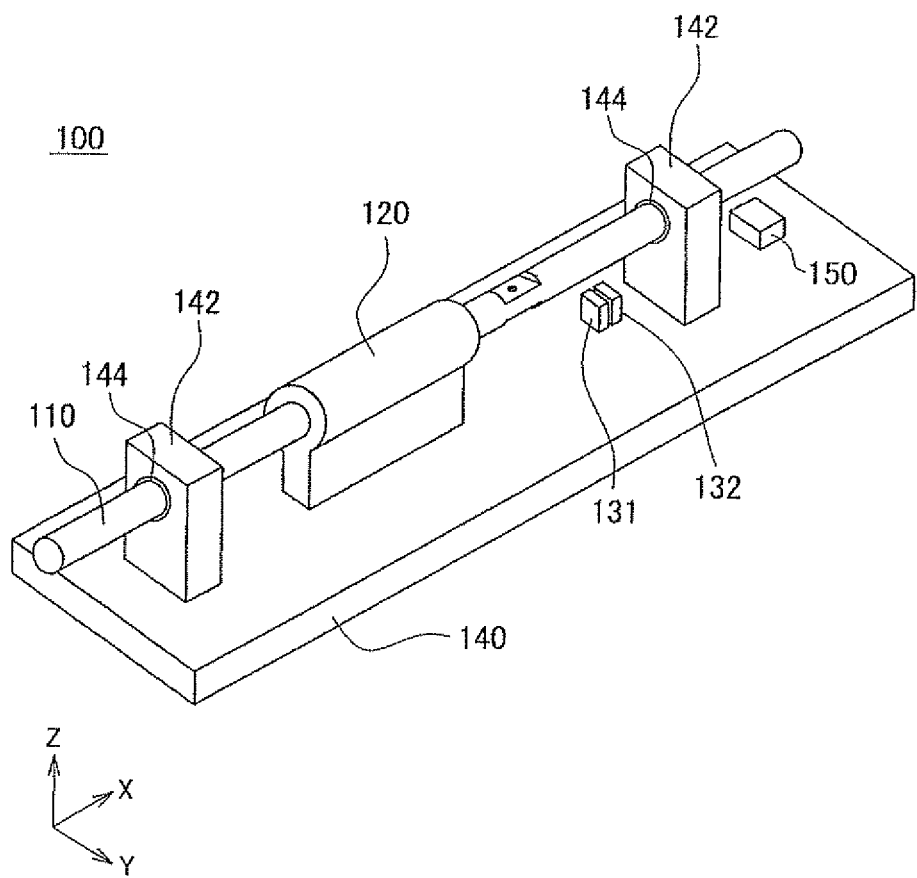
FIG. 1 is a perspective view schematically showing the overall configuration of a linear motor according to an embodiment of the present invention.

FIG. 1 is a perspective view schematically showing the overall configuration of a linear motor 100 according to an embodiment of the present invention. The linear motor 100 includes a moving member 110, a stator 120, hall elements 131 and 132, a base member 140, and a calculating section 150. The moving member 110 is a cylindrical magnet, and the stator 120 includes a hollow cylindrical drive coil.

The moving member 110 is supported by linear movement bearings 144 provided on supports 142 of the base member 140. The stator 120 is supported on the base member 140, has an inner diameter that is greater than the outer diameter of the moving member 110, and the inner surface of the stator 120 is distanced from the moving member 110. With this configuration, the moving member 110 can move smoothly along the stator 120 in the longitudinal direction thereof. In the following description, this longitudinal direction is referred to as the X-axis direction, a direction orthogonal to the mounting surface of the linear motor 100 is referred to as the Z-axis direction, and a direction orthogonal to the X-axis and the Z-axis is referred to as the Y-axis direction.

Figure 2:
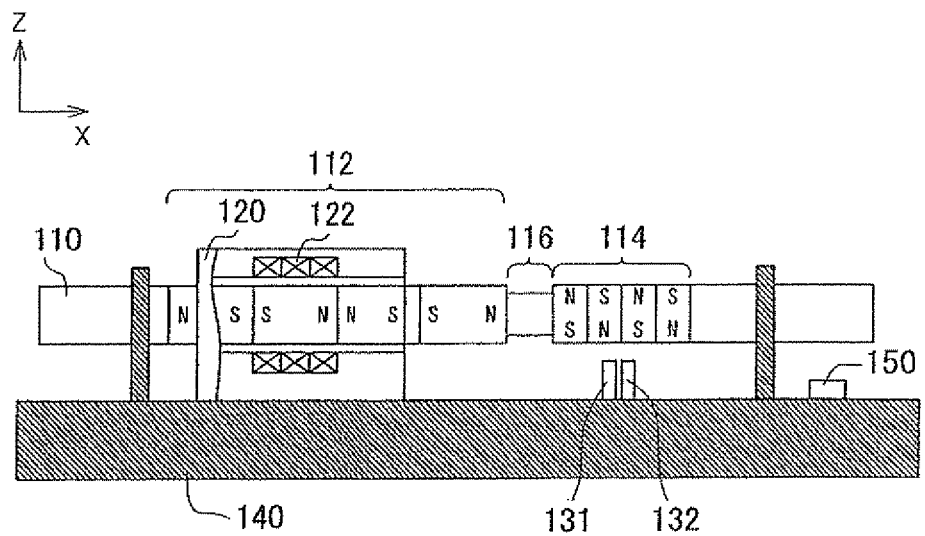
FIG. 2 is a cross-sectional view schematically showing the configuration of the linear motor.

FIG. 2 is a cross-sectional view schematically showing the configuration of the linear motor 100. The moving member 110 has three regions, which are a drive region 112 that is polarized to have a magnetic pattern for driving, a position detection region 114 that is polarized to have a magnetic pattern for position detection, and an intermediate area 116.

The intermediate area 116 includes a fixing portion that can fix the member being driven when the moving member 110 moves relative to the base member 140. Since the intermediate area 116 is not polarized, the intermediate area 116 can decrease the effect that the magnetic fields of the drive region 112 and the position detection region 114 have on each other. This effect can be achieved simply by not polarizing the intermediate region, and it is not necessary to include the fixing portion of the driven member. Furthermore, the intermediate area 116 need not be provided, and the drive region 112 and the position detection region 114 may be adjacent to each other.

The following describes the configuration of the position detecting section and the drive section of the linear motor 100. As shown in FIG. 2, the drive region 112 of the moving member 110 is polarized to achieve a polarization pattern in which the poles are arranged in the X-axis direction. On the other hand, the position detection region 114 is polarized to achieve a polarization pattern in which the poles in a direction orthogonal to the X-axis direction, which is a suitable orientation for position detection.

The drive coil portion 122 of the stator 120 is a series of coils having a U phase, a V phase, and a W phase, which are oriented in the X-axis direction. Each coil has the same width in the X-axis direction, and this width is ⅓ of the width of one pole of the drive region 112 of the moving member 110.

The drive coil portion 122 is supplied with a three-phase current corresponding to positions that have a phase difference of 120 degrees when the pitch of the poles (between N and S) of the drive region 112 has a phase of 180 degrees. As a result, thrust is generated in the X-direction due to the relationship with the magnetic pattern of the drive region 112. By controlling the current supplied to the coils according to the position of the moving member 110, the movement of the moving member 110 in the X-axis direction can be controlled.

The position of the moving member 110 is detected using the position detection region 114 and the hall elements 131 and 132 arranged at positions opposite the position detection region 114. The hall elements 131 and 132 each output a voltage corresponding to the polarity and strength of the magnetic field at the position thereof, and this output voltage changes when the moving member 110 moves. The calculating section 150 performs a calculation using this output voltage, and outputs position information of the moving member 110 as a result.

For example, it is assumed that the surface facing the hall element 131 on one end of the position detection region 114 is an S pole, and the initial position of the moving member 110 is such that one end of the position detection region 114 is positioned opposite the position of the hall element 131. When the moving member 110 moves such that the position opposite the hall element 131 moves across the width of two poles, first an N pole and then an S pole of the position detection region 114, and then stops, the resulting state is such that an S pole is positioned opposite the hall element 131. At this time, the output voltage of the hall element 131 is a sinusoidal signal (signal A) resulting from the sequential detection of the magnetic fields of an S pole, an N pole, and an S pole. The hall element 132 outputs a sinusoidal signal (signal B) in which the phase of the magnetic field is shifted by 90 degrees, such that the magnetic field output is 0 at the boundary from N to S poles, at which time the hall element 131 corresponds to an S pole.

The sinusoidal signals having a phase difference of 90 degrees therebetween can be frequency-divided by the calculating section 150 to generate pulses at positions having a prescribed resolution. Any position can be detected based on a count value, by resetting the count value of the pulses at an original sensor position or when the moving member 110 is at a prescribed mechanical stopper position. As a result, the position of the moving member 110 can be more accurately detected.

Figure 3:
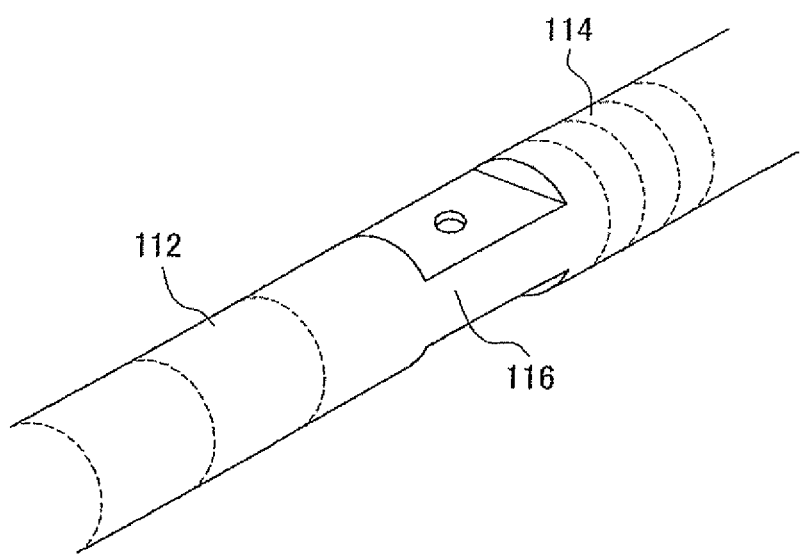
FIG. 3 schematically shows the fixing portion of the intermediate area in the moving member.

FIG. 3 schematically shows the fixing portion of the intermediate area 116 in the moving member 110. The driven body can be fixed by connecting a restraint in a central aperture. Since the intermediate area 116 is a non-magnetic region, the effect of the magnetic fields of the drive region 112 and the position detection region 114 on each other can be decreased, and the non-magnetic intermediate area 116 can also function as the fixing portion of the driven member, thereby effectively using the regions of the moving member 110.

As described in the above embodiment, the position detection can be realized using a configuration in which a single component is polarized to form the drive region 112 and the position detection region 114 and a magnetic sensor is provided. In other words, there is no need to provide an additional structure for the position detection, and therefore the linear motor can be made smaller. Furthermore, the drive region 112 and the position detection region 114 can be formed by one performance of a polarization process, and therefore the number of steps used in the manufacturing is decreased. Accordingly, the manufacturing cost can be decreased.

As shown in FIGS. 2 and 3, the pitch of the magnetic pattern of the drive region 112 in the above embodiment is greater than the pitch of the magnetic pattern of the position detection region 114. With this configuration, the position can be controlled more precisely than allowed by the magnetic pattern of the drive region 112.

For example, when there are three phases of coils and the width of one coil is ⅓ the width of one pole of the drive region 112, as in the above embodiment, setting the coils of the position detection region 114 to have the same pitch as the coils enables the polarity of the drive region 112 at positions opposite each of the coils to be known. Furthermore, even more precise positional control can be realized by using a lower pitch to control the position using one or two phase modes, for example. The present invention is not limited to three phases of coils, and may instead include two phases or four or more phases of coils, or may use a single phase.

The above embodiment describes an example in which the moving member 110 has a cylindrical shape. Compared to forming the moving member 110 as a square pillar, for example, forming the moving member 110 as a cylinder achieves the effects of effectively using space and being suitable for complementing the linear movement bearing, for example. On the other hand, the moving member 110 may be formed as a square pillar or a flat shape, depending on the intended use and environment.

In the above embodiment, a hall element is used as the magnetic sensor, but the present invention is not limited to this. Instead, a magnet diode or magnetoresistance effect element, for example, may be used.

In the above embodiment, the drive coil portion 122 of the stator 120 is arranged on the outside of the moving member 110, but the present invention is not limited to this. As another example, a central axis may be fixed to the base member as the stator, and an annular magnet may be arranged around the central axis as the moving member. In this case, the fixing portion of the intermediate area 116 is preferably arranged to avoid the central axis, and the intermediate area 116 may be removed such that the drive region 112 and the position detection region 114 are adjacent. The hall elements 131 and 132 may be arranged on the stator, instead of on the base member.

The above embodiment describes a moving-magnet linear motor in which the moving member 110 is a magnet, but the present invention is not limited to this. Instead, a moving-coil linear motor may be used, in which the coils operate as the moving member.

Figure 4:
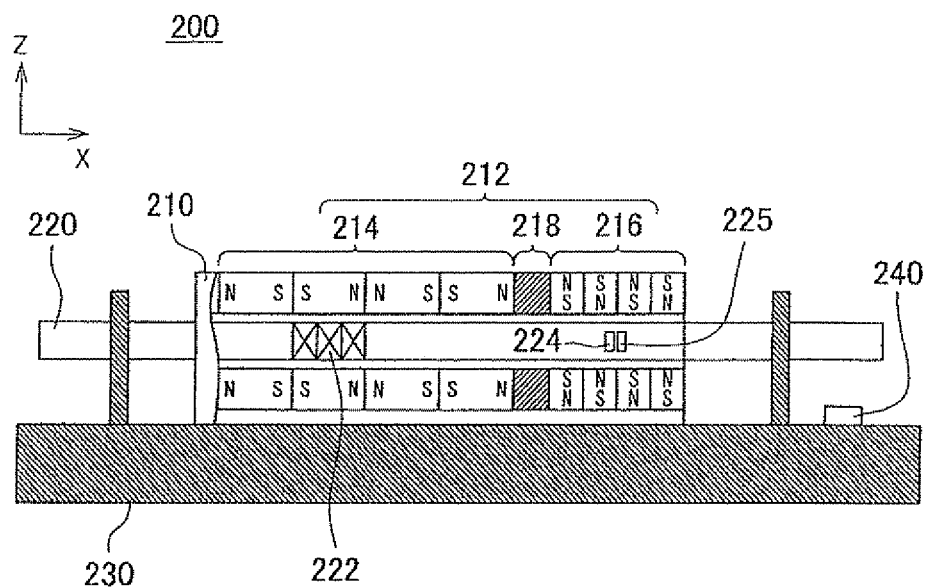
FIG. 4 is a cross-sectional view schematically showing a moving-coil linear motor as another embodiment of the present invention.

FIG. 4 is a cross-sectional view schematically showing a moving-coil linear motor as another embodiment of the present invention. The linear motor 200 includes a stator 210, a moving member 220, hall elements 224 and 225 arranged on the moving member 220, a base member 230, and a calculating section 240.

The stator 210 is supported by the base member 230, and is a hollow cylinder with an inner diameter that is greater than the outer diameter of the cylindrical moving member 220. The inner surface of the stator 210 is distanced from the moving member 220. The moving member 220 is supported via a linear movement bearing provided on the support of the base member 230. With this configuration, the moving member 220 moves smoothly in the X-axis direction along the stator 210.

The stator 210 includes a magnet 212, and the magnet 212 has three regions, which are a drive region 214, a position detection region 216, and an intermediate area 218. The drive region 214 is polarized to have a magnetic pattern for driving, in which the poles are arranged in the X-axis direction. The position detection region 216 is polarized to have a magnetic pattern for position detection, in which the poles are arranged in a direction orthogonal to the X-axis direction. The intermediate area 218 is not polarized, in order to decrease the effect of the magnetic fields of the drive region 214 and the position detection region 216 on each other.

The moving member 220 includes a central axle and a drive coil portion 222, which has a plurality of coils disposed around the central axle. The drive coil portion 222 may include coils having a U phase, a V phase, and a W phase, which are oriented in the longitudinal direction of the moving member 220. Each coil has the same width in the longitudinal direction, and this width is ⅓ of the width of one pole of the drive region 214.

The drive coil portion 222 is supplied with a three-phase current corresponding to positions that have a phase difference of 120 degrees when the pitch of the poles (between N and S) of the drive region 214 is a phase of 180 degrees. As a result, thrust is generated in the X-direction due to the relationship with the magnetic pattern of the drive region 214. By controlling the current supplied to the coils according to the position of the moving member 220, the movement of the moving member 220 in the X-axis direction can be controlled.

The position of the moving member 220 is detected using the position detection region 216 and the hall elements 224 and 225 arranged at positions opposite the position detection region 216. The hall elements 224 and 225 each output a voltage corresponding to the polarity and strength of the magnetic field at the position thereof, and therefore the hall elements 224 and 225 output sinusoidal voltages that are phase-shifted from each other by 90 degrees according to movement of the moving member 220. The calculating section 240 outputs position information concerning the moving member 220 by performing a counting operation and a computation using the output voltages.

As described above, the position detection can be realized by polarizing the magnet 212 of the stator 210 to create the drive region 214 and the position detection region 216 and providing a magnetic sensor. In other words, there is no need to provide an additional structure for the position detection, and therefore the linear motor can be made smaller.

FIG. 5 is a schematic cross-sectional view of an overall configuration of an image capturing apparatus 500 including a lens unit 300, which is an exemplary application of the linear motor according to the above embodiment. The image capturing apparatus 500 is formed by combining the lens unit 300 and an image capturing section 400.

The lens unit 300 includes a lens barrel 310, a stator 320, a moving member 330, hall elements 341 and 342, a lens holding frame 350, a guide axle 360, a sliding part 370, and a lens group 380. The lens group 380 includes focusing lenses 382 and 384, which are arranged on a common optical axis C. The lens unit 300 is formed integrally with the image capturing section 400 by being connected to a mount section 460 of the image capturing section 400, which is described further below.

The moving member 320 is a cylindrical magnet, and is polarized to have the magnetic pattern for driving. The stator 330 is fixed to the barrel 310, and includes a hollow cylindrical drive coil. The stator 330 has an inner diameter that is greater than the outer diameter of the moving member 320, and the inner surface of the stator 330 is distanced from the moving member 320.

The hall elements 341 and 342 are fixed to the barrel 310, and detect a change in the magnetic field caused by movement of the moving member 320. The change in the magnetic field detected by the hall elements 341 and 342 is used to detect the position of the moving member 320, and a detailed explanation of this process is provided further below. The lens holding frame 350 is connected to the moving member 320 and moves together with the moving member 320. The sliding part 370 has a hollow cylindrical portion with an inner diameter that is slightly larger than the outer diameter of the guide axle 360, and the inner surface thereof freely fits with the surface of the guide axle 360. With this configuration, current is supplied to the drive coil of the stator 330 to move the moving member 320, thereby driving the focusing lens 382 held by the lens holding frame 350.

The image capturing section 400 includes an optical system having a main mirror 440, a sub mirror 442, a pentaprism 470, and a finder optical system 490, and a control system having a focal point detecting section 430, a main control section 450, a calculating section 452, and a photometric unit 480. When the main mirror 440 is in an image capture position the sub mirror 442 is raised out of the optical path of the incident light.

When in the standby position, the main mirror 440 is inclined relative to the incident light and guides a majority of the incident light to a focusing screen 472 arranged thereabove. The focusing screen 472 is arranged at the focal position of the optical system, and displays the image formed by the optical system. The image formed by the focusing screen 472 can be seen from the finder optical system 490 via the pentaprism 470. The incident light passed by the main mirror 440 is reflected by the sub mirror 442 and guided to the focal point detecting section 430. The focal point detecting section 430 detects the focal state of a subject from the lens unit 300.

The image capturing section 400 includes a shutter 420, an optical filter 412, and an image capturing element 410 that are arranged in the stated order on the optical axis C behind the main mirror 440 in a direction of the incident light from the lens unit 300. When the release switch of the image capturing section 400 is pressed, the main mirror 440 moves to the image capture position and removed from the optical path of the incident light. Therefore, the incident light is directed to be incident to the shutter 420. When the shutter 420 is opened, the incident light progresses to be incident to the image capturing element 410, and the subject image is formed on the light receiving surface of the image capturing element 410. As a result, the image formed on the light receiving surface is converted into an electrical signal by the image capturing element 410.

When the image capturing section 400 performs an autofocus operation, the control section 450 drives the focusing lens 382 by applying a drive pattern current to the drive coil of the lens unit 300. The present embodiment adopts a phase difference AF method. With this method, a separating lens is used to generate two images from incident light from the lens unit 300, and a line sensor is used to measure the interval between the images and detect the blur amount. The focal position of the focusing lens 382 is then determined, and the drive pattern current is applied to the drive coil to drive the focusing lens 382 to the focal position. Although this embodiment uses the phase difference AF method, the contrast AF method may be used instead, particularly if the main objective is capturing moving images.

Figure 6:
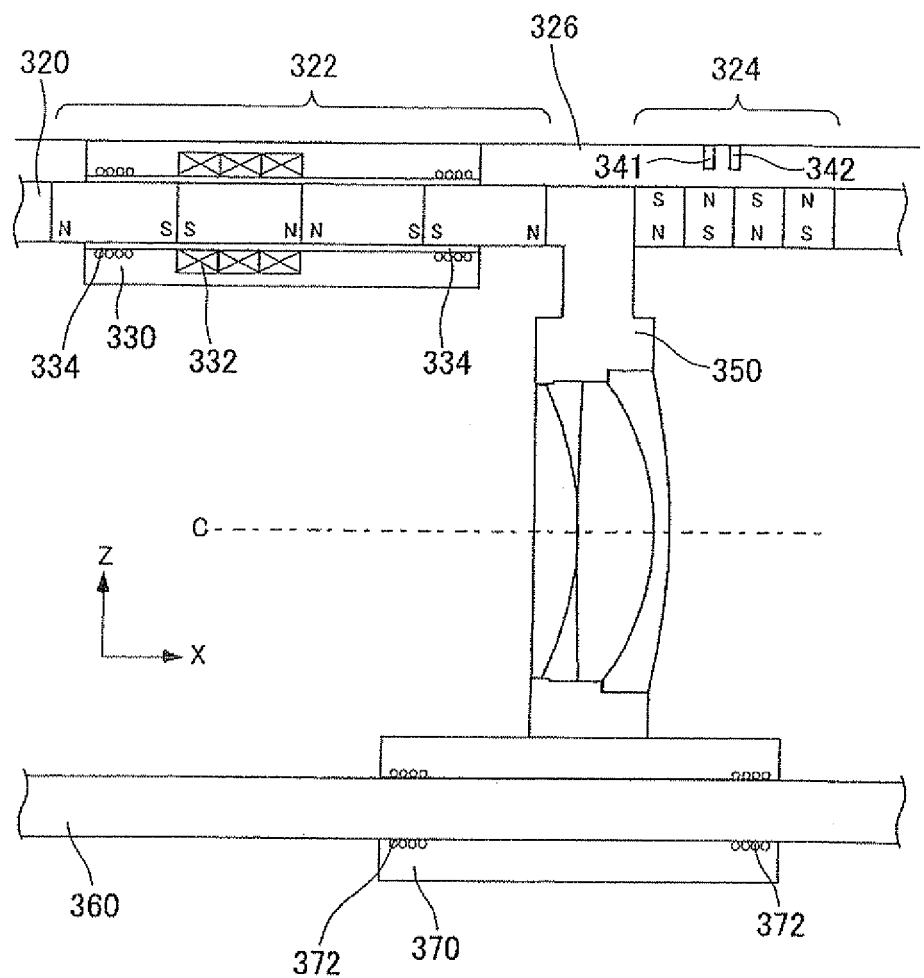
FIG. 6 is a schematic view of the configuration of the lens unit.

FIG. 6 is a schematic view of the configuration of the lens unit 300. The moving member 320 is a cylindrical magnet, and includes a drive region 322 that is polarized to have a magnetic pattern for driving, a position detection region 324 that is polarized to have a magnetic pattern for position detection, and a fixing portion 326. The stator 330 includes a cylindrical drive coil 332 and a linear movement bearing 334.

The drive region 322 of the moving member 320 is polarized to achieve a polarization pattern in which the poles are arranged in the X-axis direction. On the other hand, the position detection region 324 is polarized to achieve a polarization pattern in which the poles are arranged in a direction orthogonal to the X-axis direction. The fixing portion 326 is not polarized, and is connected to the lens holding frame 350.

The moving member 320 is supported via the linear movement bearing 334. Linear movement bearings 372 are arranged within the inner surface of the sliding part 370, at both ends thereof, and the sliding part 370 is supported from the guide axle 360 via the linear movement bearings 372. With this configuration, the focusing lens 382 can move smoothly relative to the direction of the optical axis.

In the manner described above, the sliding part 370 freely fits with the guide axle 360. In other words, the sliding part 370 and the guide axle 360 engage with each other while keeping space therebetween. The fit tolerance of the linear movement bearing 334 is set to be less than the fit tolerance of the guide axle 360. In other words, the moving member 320 has less freedom than the guide axle 360, and is highly restrained.

As a result, compared to a configuration in which the moving member 320 is less restrained than the guide axle 360, the above configuration can drive the moving member 320 with more stability. When the linear motor and the guide axles are used in this way, the linear motor can be driven with more stability by using the guide axle having the highest restraint among the plurality of guide axles as the moving member.

The drive coil 332 of the stator 330 is a series of coils having a U phase, a V phase, and a W phase, which are oriented in the X-axis direction. Each coil has the same width in the X-axis direction, and this width is ⅓ of the width of one pole of the drive region 322 of the moving member 320.

The drive coil 332 is supplied with a three-phase current corresponding to positions that have a phase difference of 120 degrees when the pitch of the poles (between N and S) of the drive region 322 has a phase of 180 degrees. As a result, thrust is generated in the X-direction due to the relationship with the magnetic pattern of the drive region 322. By controlling the current supplied to the coils according to the position of the moving member 320, the movement of the moving member 320 in the X-axis direction can be controlled.

The position of the moving member 320 is detected using the position detection region 324 and the ball elements 341 and 342 arranged at positions opposite the position detection region 324. The hall elements 341 and 342 each output a voltage corresponding to the polarity and strength of the magnetic field at the position thereof, and therefore the hall elements 341 and 342 output sinusoidal voltages that are phase-shifted from each other by 90 degrees according to movement of the moving member 320. The calculating section 452 outputs position information concerning the moving member 320 by performing a counting operation and a computation using the output voltages.

With the above configuration, the focusing lens 382 connected to the moving member 320 can move in the direction of the optical axis, which is parallel to the driving direction of the moving member. In the above embodiment, the image capturing section 400 includes the calculating section 452, but the lens unit 300 may include the calculating section 452 instead. In this case, the positional information concerning the moving member 320 calculated by the calculating section 452 is transmitted to the control section 450 of the image capturing section 400 via the mount section 460.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. A linear motor comprising:
    a magnet including a first region polarized to have a magnetic pattern for driving and a second region polarized to have a magnetic pattern for position detection, the first and second regions being arranged linearly in a direction of the driving;
    a drive coil that is provided opposite the first region and generates a drive force exerted on the magnet in the direction of the driving;
    a magnetic sensor arranged opposite the second region;
    a base member that supports the magnet, the drive coil, and the magnetic sensor such that the magnet can be moved relative to the drive coil and the magnetic sensor in the driving direction;
    a third region, which is not polarized, between the first region and the second region; and
    a fixing portion of a driven body in the third region.

2. The linear motor according to claim 1, wherein a pitch of the magnetic pattern for driving is greater than a pitch of the magnetic pattern for position detection.

3. The linear motor according to claim 1, wherein the magnet is a cylinder, and the second region is formed in a region that differs from the first region in the driving direction.

4. The linear motor according to claim 1, wherein the drive coil includes a plurality of phases.

5. The linear motor according to claim 1, further comprising a calculating section that outputs a position of the magnet, based on output of the magnetic sensor.

6. A lens unit comprising the linear motor of claim 1 and a lens, wherein the lens is held by a lens holding frame including a plurality of guide axles that are each parallel to the driving direction, such that the lens can move in a direction of an optical axis, which is parallel to the driving direction, and the linear motor uses, as a moving member including the magnet or the drive coil, the guide axle having the highest degree of restraint among the plurality of guide axles.

7. The linear motor according to claim 1, wherein the first region and the second region of the magnet are provided at different positions on a line extending in the direction of driving.

8. A linear motor comprising:
    a magnet including a first region polarized to have a magnetic pattern for driving and a second region polarized to have a magnetic pattern for position detection, the first and second regions being arranged linearly in a direction of the driving;
    a drive coil that is provided opposite the first region and generates a drive force exerted on the magnet in the direction of the driving;
    a magnetic sensor arranged opposite the second region; and
    a base member that supports the magnet, the drive coil, and the magnetic sensor such that the magnet can be moved relative to the drive coil and the magnetic sensor in the driving direction;
    wherein the first region is polarized such that the magnetic pattern thereof is oriented in the driving direction, and the second region is polarized such that the magnetic pattern thereof is oriented in a direction orthogonal to the driving direction.

9. The linear motor according to claim 8, further comprising a third region, which is not polarized, between the first region and the second region.

10. The linear motor according to claim 9, wherein if the magnet moves relative to the base member, the linear motor comprises a fixing portion of a driven body in the third region.

11. The linear motor according to claim 8, wherein pitch of the magnetic pattern for driving is greater than pitch of the magnetic pattern for position detection.

12. The linear motor according to claim 8, wherein the magnet is a cylinder, and the second region is formed in a region that differs from the first region in the driving direction.

13. The linear motor according to claim 8, wherein the drive coil includes a plurality of phases.

14. The linear motor according to claim 8, further comprising a calculating section that outputs a position of the magnet, based on output of the magnetic sensor.

15. A lens unit comprising the linear motor of claim 8 and a lens, wherein the lens is held by a lens holding frame including a plurality of guide axles that are each parallel to the driving direction, such that the lens can move in a direction of an optical axis, which is parallel to the driving direction, and the linear motor uses, as a moving member including the magnet or the drive coil, the guide axle having the highest degree of restraint among the plurality of guide axles.

16. The linear motor according to claim 8, wherein the first region and the second region of the magnet are provided at different positions on a line extending in the direction of driving.

* * * * *